United States Patent Office 3,641,211
Patented Feb. 8, 1972

3,641,211
SULFUR-CURABLE OLEFIN POLYMER
COMPOSITIONS
Carl P. Strange and Gordon Y. T. Liu, Baton Rouge, La., assignors to The Dow Chemical Company, Midland, Mich.
No Drawing. Filed Oct. 17, 1968, Ser. No. 768,512
Int. Cl. C08f 29/12
U.S. Cl. 260—889      6 Claims

ABSTRACT OF THE DISCLOSURE

Sulfur-curable compositions of normally solid olefin polymers, such as polyethylene, and organic polymers having terminal ethylenic unsaturation, such as 1,2-polybutadiene are prepared by a method comprising the steps of (1) intimately admixing the polymeric components of the composition, (2) cracking the polymeric components of the resulting mixture using heating and shearing means, such as a screw-type extruder, and (3) introducing a sulfur curing agent into the cracked mixture.

BACKGROUND OF THE INVENTION

This invention relates to a process for preparing sulfur-curable compositions of saturated olefin polymers and unsaturated organic polymers containing terminal ethylenically unsaturated groups in their molecular structure.

Polyolefins, while very valuable, would be ideally suited for many more uses if it were not for a few limitations posed by their properties. Uncured polyolefins, especially polyethylene, become essentially liquid at elevated temperatures, dissolve or swell substantially in numerous common solvents, become weak and brittle and loading beyond a few percent with most pigments, and usually undergo substantial environmental stress cracking. Cross linking or curing substantially corrects each of these deficiencies of the polyoelfins, while the properties of the uncured polyolefins such as toughness, flexibility, impact resistance and chemical resistance are unimpaired or even improved.

It is known to crosslink saturated polyolefins by high energy irradiation or in the presence of peroxides such as dicumyl peroxide. However, in some instances these methods are undesirable because (1) safety problems arise in both the irradiation and peroxide methods, (2) the reactions must be carried out at fairly high temperatures, and (3) highly branched polyolefins tend to undergo chain scission rather than cross linking.

Sulfur vulcanization of saturated polymers, if it were possible under conditions similar to those used for vulcanizing unsaturated polymers such as natural rubber, would be a more desirable method primarly because it is a less hazardous vulcanization technique and it has relatively low cost. Unfortunately, saturated polymers such as polyethylene are not vulcanized by sulfur unless other rather expensive additives are also present in the blend. Attempts to introduce unsaturation into the polymer by using a second monomer which contains two or more carbon-to-carbon double bonds during polymerization or by dehalogenation of a halogenated olefin polymer have not been altogether successful and are somewhat limited in scope.

In view of the prior discussion of the art, a method for preparing a composition which is essentially a saturated olefin polymer and is capable of being vulcanized with a conventional sulfur curing agent would be highly desirable.

SUMMARY OF THE INVENTION

In accordance with the present invention a method for preparing a sulfur-curable composition which is essentially a saturated olefin polymer is provided.

The present invention is a method, hereinafter described in detail, which comprises the steps of (1) intimately admixing from about 80 to about 99.8 parts by weight of a normally solid, saturated olefin polymer with from about 0.1 to about 10 parts by weight of an unsaturated organic polymer having terminal ethylenically unsaturated groups in its molecular structure, (2) cracking the polymeric components of the resulting mixture by heating and shearing means, and (3) introducing from about 0.1 to about 10 parts by weight of a sulfur curing agent into the cracked mixture. The resulting composition is readily cured by heating the composition to curing temperature usually from about 150° C. to about 400° C. It is believed that in the cracking step the molecular chains of both the saturated and unsaturated components are broken to form fragments having free radicals on at least one end of each fragment. The resulting fragments interact with one another to form block or graft copolymers of the saturated and unsaturated components. Upon introduction of the sulfur curing agent into the mixture and heating the mixture to the curing temperature, the terminal ethylenically unsaturated groups of different copolymer chains form cross linkages between the chains. It is critical that the unsaturated component have terminal ethylenically unsaturated groups in its molecular structure as blends of saturated olefin polymers and unsaturated polymers which contain only cis- and/or trans-internal unsaturation are not cured by the method of this invention.

The resulting cured polymer products of this invention have low melt flow viscosities and high tensile strength. Articles molded from these highly crosslinked polymers exhibit increased resistance to high temperatures and to abrasive forces. These polymer compositions are useful in the manufacture of wire cable jacketing, molded articles, heat resistant coatings for furniture, and the like.

DESCRIPTION OF THE PREFERRED EMBODIMENTS

The saturated olefin polymers utilized as the major component in the curable composition are essentially homopolymers and copolymers of the $\alpha$-olefins and the monovinylidene aromatic compounds and the copolymers of such monomers and other ethylenically unsaturated monomers. For the purposes of this invention, saturated polymers are defined as those which contain no aliphatic unsaturation, e.g., alkenyl or alkynyl bonds. Suitable saturated olefin polymers when subjected to heat and/or high shear, hereinafter called cracking conditions, undergo a substantial number of scissions at C—C bonds in the polymer chains, thereby resulting in the formation of free radicals. For further discussion of this phenomenon, see the discussion of thermal degradation of monovinylidene aromatic and olefin polymers in Chapters III and IV by S. L. Madovsky, Thermal Degradation of Organic Polymers, Interscience Publishers, New York (1964). As discussed previously the formation of free radicals on the polymer chains of both the saturated and unsaturated components is thought to be necessary in order to introduce terminal ethylenically unsaturated groups onto the polymer chain of the saturated polymer.

Examples of suitable polyolefins include the various types of polyethylene, e.g., linear polyethylene and highly branched polyethylene; polypropylene; poly(isobutane);

poly(sec-butene); poly(1-butene); poly(1-hexene); and the like.

Examples of poly(monovinylidene aromatics) include polystyrene, poly(α-methylstyrene), poly(ar-methylstyrene), poly(ar-ethylstyrene), poly(α,ar-dimethylstyrene), poly(ar,ar-dimethylstyrene), poly(ar-t-butylstyrene), and the like.

Examples of suitable copolymers include the copolymers of ethylene and butene-1, ethylene and propylene, and copolymers of α-olefins and monovinylidene aromatic monomers.

In these specifications and claims, by the word "monovinylidene" in the term "monovinylidene aromatic" monomer or compound is meant that to an aromatic ring in each molecule of the monomer or compound is attached one radical of the formula,

wherein R is hydrogen or a lower alkyl such as an alkyl having from 1 to 4 carbon atoms, e.g., methyl, ethyl, n-propyl, n-butyl and isobutyl.

Suitable saturated hydrocarbon polymers may also contain small amounts, i.e., up to about 10 weight percent based on the polymer, of other monomers which are ethylenically unsaturated. Typical such other monomers include the alkyl esters of an acrylic acid in which the alkyl portion has from 1 to 12 carbon atoms, such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, n-octyl acrylate, n-octyl methacrylate, n-decyl methacrylate, and dodecyl methacrylate; the ethylenically unsaturated esters of saturated carboxylic acids such as vinyl acetate and vinyl propionate; the ethylenically unsaturated ketones such as methyl isopropenyl ketone, and the like.

Saturated polymers which are preferred because of their availability and the relative ease of cracking them to form free radicals are the polymers of α-olefins, especially the homopolymers of ethylene and propylene and the copolymers of ethylene and other α-olefins containing at least 80 mole percent of polymerized ethylene.

Saturated olefin polymers suitable for the purposes of this invention are readily prepared by the methods described in Sittig, Polyolefin Processes, Chemical Process Review, National Development Corp., No. 2 (1967).

Suitable unsaturated organic polymers are those having terminal ethylenically unsaturated groups in their molecular structure. Such polymers include those having the configuration

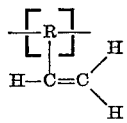

where R is a hydrocarbon polymer. Such unsaturated polymers undergo C—C bond scission to form free radicals when subjected to the cracking conditions of heat and high shear used to crack the saturated olefin polymer. Examples of such polymers include the unsaturated polymers and copolymers of alpha, omega-multi-olefins, i.e., multi-ethylenically unsaturated hydrocarbons having at least two vinyl groups (—CH=CH$_2$) per monomer molecule, the polymer molecules having structures such that the multi-olefin monomer polymerized therein still has a vinyl group. Examples of such polymers include 1,2-polybutadiene, poly(1,4-pentadiene), poly(1,5-hexadiene), 1,2-polyhexatriene, poly(1,3,6-heptatriene) and the like. Polymers having terminal ethylenically unsaturated groups also include polymerized unsaturated bicyclic compounds having the configuration

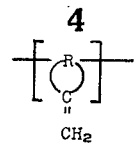

where R is polymerized cyclic hydrocarbon, for example, polymers of methylene norbornylene. Preferably the unsaturated organic polymer is 1,2-polybutadiene due to its availability and ease of cracking. 1,2-polybutadiene is readily prepared by polymerizing 1,3-butadiene under conditions which promote 1,2-polymerization over 1,4-addition. Methods for preparing said polymer are described by A. W. Meyer et al. in J. Am. Chem. Soc., 74, 2294 (1952). Methods for preparing suitable polymers of other specified monomers are well known to those skilled in the art.

The suitable unsaturated organic polymers may optionally contain other polymers, both saturated and internally unsaturated. However when such other polymers are present, care must be taken that sufficient unsaturated component be added so that the polymer or polymers having terminal ethylenically unsaturated groups amounts to at least 0.1 weight percent of the total curable composition.

Sulfur curing agents utilized in this invention include sulfur and sulfur compositions containing one or more conventional accelerators. In most instances it is desirable to use an accelerator to increase the amount and rate of crosslinking during the curing process. Among the most useful types of accelerators are the metallic accelerators which include metals, inorganic metallic compounds, and metallic salts of carboxylic acids. Preferred substances are aluminum powder, the metal halides, oxides, sulfides, ammonium sulfates and the metallic salts of alkyl mono- and dicarboxylic acids. Specific examples are iron oxide (ferrous and ferric), iron chloride, aluminum chloride, iron "octasol" (iron 2-ethyl-hexoate) and iron di-stearate.

Other examples of vulcanizing accelerators which may be used are the aryl substituted guanidines, e.g., diphenylguanidine, di-o-tolylguanidine, and triphenylguanidine; aldehyde-amine condensation products, e.g., butyraldehyde-aniline, formaldehyde - toluidine, acetaldehyde-aniline, and butyraldehyde - butylamine; dithiocarbamates prepared by reacting a secondary amine with carbon disulfide and a base; thiuram sulfides, e.g., tetramethylthiuram disulfide, tetraethylthiuram disulfide, and tetrabutylthiuram disulfide; 2-mercapto benzothiazole and its derivatives; zinc diethyldithiocarbamate and the like. These accelerators may be present in amounts of about 0.0001 to about 10 parts by weight based on the curing composition, preferably from about 0.05 part to about 5 parts.

Small amounts, i.e., up to 15 parts by weight based on the total curable composition, of fillers and other ingredients such as a variety of carbon blacks, clays, silicas, whitings, and antioxidants which are often desirable are optionally present in the curable composition. Preferably these ingredients are introduced after the polymeric components are cracked. The use of carbon blacks is especially desirable in some instances since they often accelerate or promote further crosslinking.

The curable compositions prepared by the method of this invention contain (1) from about 80 to about 99.8 weight percent of the saturated olefin polymer, preferably from about 90 to about 95 weight percent; from about 0.1 to about 10 weight percent of the vinyl-unsaturated organic polymer, preferably from about 0.3 to about 7 weight percent; and (3) from about 0.1 to about 10 weight percent of the sulfur curing agent, preferably from about 7 to about 9 weight percent, based on the total weight of these ingredients.

The method of this invention comprises the steps of (1) intimately admixing specified amounts of the saturated and unsaturated polymeric components of the curable composition, (2) subjecting the resulting mixture to cracking conditions, and (3) introducing a specified amount of the sulfur curing agent into the cracked mixture.

An intimate admixture of the polymeric components is readily attained by tumbling dry powders of the polymeric components in a bulk container, e.g., a paperboard barrel. Uniform mixtures are also achieved using a Banbury mixer or a screw-type extruder.

The most critical step of the novel method is the step wherein the admixture is subjected to the cracking conditions of heat and/or high shear, usually until the melt flow viscosity of the mixtures is increased to a value from about 30 to about 60 decigrams/minute as determined by ASTM D-1238-65T(E). Specific cracking condition depend primarily on the particular polymers being cracked. However, for the purposes of illustration, mixtures of polyethylene and 1,2-polybutadiene are readily cracked at temperatures between about 200° C. and about 500° C. and shear rates between about 200 and 100,000 reciprocal seconds. Apparatus suitable for cracking the polymeric components are shearing and heating apparatus such as a screw-type extruder.

In one embodiment wherein the components are cracked using a screw-type extruder operating at temperatures between 350° C. and 500° C. the extrusion rate is such that no part of the polymer remains in the extruder barrel more than one minute. If the polymer is exposed to these cracking conditions for a longer period of time, the polymeric components of the mixture are degraded to such a degree that the mixture cannot be crosslinked sufficiently to increase high temperature resistance above that of the original saturated polymeric component. Under such conditions, the mixture is sufficiently cracked in periods of 30 seconds or less. However, it is generally physically impractical to extrude polymeric materials at rates so great that the material remains in the extruder for a time less than 30 seconds.

The method of this invention also contemplates an embodiment wherein steps (1) and (2) are carried out simultaneously, for example, the unmixed polymeric components may be fed into a screw-type extruder operating at cracking conditions.

After the curing agent is thoroughly mixed with the cracked blend in a Banbury mixer or other standard mixing apparatus, crosslinking of the polymeric blend is readily effected by subjecting the resulting curable blend to temperatures from about 170° C. to about 280° C., preferably from about 180° C. to about 210° C., for a period from about 1 to 40 minutes, preferably from about 15 to about 25 minutes. In one embodiment of this invention the curable blend is first fabricated to the desired shape and then the shaped article is subjected to curing temperatures. In a second embodiment the fabricating and curing steps are carried out simultaneously. For example, the curable blend is fed into a shaping means, e.g., a screw-type extruder equipped with the desired shaping die, said means being heated to the cure temperature of the blend; and the blend is then extruded at a rate such that cure is effected as the blend extrudes through the shaping die. Curing of the blend prior to fabrication is generally undesirable since the workability of blend is substantially reduced after it is cured.

The following examples are illustrative of the present invention and are not to be construed as limiting its scope. In the specification and claims all parts and percentages are by weight unless otherwise indicated.

EXAMPLES 1-3

A 97-part portion of linear polyethylene having a melt index of 4 decigrams per minute as determined by ASTM D-1238-65T(E) and 3 parts of polybutadiene containing 65 percent 1,2-polybutadiene were blended on a Banbury mixer. The resulting blends were cracked in a Werner and Pfleiderer ZSK twin screw extruder operating at 300 r.p.m., a temperature of 300° C., and an output of 75 lb./hr. The resulting blend was divided into 3 parts and each was mixed with a different amount of sulfur curing agent on the Banbury mixer and heated to 190° C. The degree of cross-linking in the different mixtures is shown in the following Table I in terms of melt flow viscosity in decigrams/minute, with a lowering of melt flow viscosity indicating an increase in crosslinking.

TABLE I

| Example | Curing agent,[1] percent | Time, min. | Melt flow viscosity,[2] dg./min. |
|---|---|---|---|
| 1 | 1 | 0 | 6.0 |
|   |   | 5 | 5.2 |
|   |   | 10 | 4.4 |
|   |   | 20 | 3.5 |
| 2 | 3 | 0 | 5.0 |
|   |   | 5 | 3.2 |
|   |   | 10 | 2.1 |
|   |   | 20 | 1.4 |
| 3 | 7 | 0 | 5.6 |
|   |   | 5 | 2.1 |
|   |   | 10 | 0.84 |
|   |   | 20 | 0.25 |

[1] A mixture containing 1.5 parts sulfur, 5 parts zinc oxide, 1 part stearic acid, 1.5 parts N-oxydiethylene benzothiazoyl-2-sulfeneamine, and 0.5 parts benzothiazoyl disulfide.
[2] As determined by ASTM D-1238-65T(E).

In a similar manner, control samples of linear polyethylene and polybutadiene containing little or no vinyl unsaturation were blended, cracked, and subjected to curing conditions. The results of testing these blends as shown in the following Table II for comparison purposes indicate that the presence of vinyl groups in the unsaturated component substantially increases crosslinking.

TABLE II

| Control sample | Curing agent,[1] percent | Time, min. | Melt flow viscosity,[2] dg./min. |
|---|---|---|---|
| 1* | 7 | 0 | 6.7 |
|   |   | 5 | 5.6 |
|   |   | 10 | 5.2 |
|   |   | 20 | 4.6 |
| 2* | 0 | 0 | 6.7 |
|   |   | 5 | 6.8 |
|   |   | 10 | 6.9 |
|   |   | 20 | 6.9 |

[1] Same as in Table I.
[2] Same as in Table I.
*Not an example of the invention.

As evidenced in the above Tables I and II, melt flow viscosities of compositions containing 1.95 weight percent of polymer having vinyl groups are reduced considerably more than those compositions containing no vinyl groups.

EXAMPLE 4

A polymeric mixture was prepared essentially according to Examples 1-3. The mixture was cracked in a screw-type extruder at 260° C. to melt flow viscosity of 50.0 decigrams/minute, then mixed with the curing agent used in Examples 1-3 and cured by essentially the same procedure used therein. For the purposes of comparison and to show the necessity of cracking the polymeric components prior to introducing the sulfur curing agent and curing, Samples $C_1$ and $C_2$ were prepared essentially according to Example 4 except in preparing $C_1$ polyethylene alone was cracked at 260° C. and then mixed with the unsaturated component and the sulfur curing agent and in preparing $C_2$ the polymeric components which had not previously been cracked and the sulfur curing agent were mixed on a Banbury mixer. The results of subjecting the composition of Example 4 and the Samples $C_1$ and $C_2$ to curing conditions are shown in the following Table III.

TABLE III

| Example | Time, min. | Melt flow viscosity,[1] dg./min. |
|---|---|---|
| 4 | 0 | 50.0 |
|   | 5 | 2.3 |
|   | 10 | 1.0 |
|   | 20 | 0.75 |
| C₁* | 0 | 9.0 |
|   | 5 | 2.8 |
|   | 10 | 3.0 |
|   | 20 | 3.2 |
| C₂* | 0 | 7.7 |
|   | 5 | 1.8 |
|   | 10 | 2.2 |
|   | 20 | 2.5 |

[1] Same as 2 in Table I.
*Not examples of this invention.

As evidenced in the above Table III, subjecting the polymeric components to cracking conditions prior to introducing the sulfur curing agent and curing the composition substantially increases the degree of crosslinking in the cured composition.

EXAMPLE 7

Following the procedure of Example 1, a blend of 88 percent of the linear polyethylene of Example 1, 9 percent of the sulfur curing agent of Example 1, and 3 percent of polybutadiene containing 15 percent 1,2-polybutadiene and 85 percent cis,trans-1,4 polybutadiene was prepared and cured. The results are shown in the following table. For the purposes of showing necessity of the sulfur curing agent, a control sample C * of the same polymeric components without the curing agent was prepared, subjected to curing condition and tested. These results are also shown in Table IV following.

TABLE IV

| Example | Sulfur curing agent,[1] (percent) | Time, min. | Melt flow viscosity,[2] dg./min. |
|---|---|---|---|
| 7 | 9 | 0 | 11.5 |
|   |   | 5 | 3.8 |
|   |   | 10 | 2.5 |
|   |   | 20 | 1.8 |
| C* | 0 | 0 | 11.6 |
|   |   | 5 | 11.2 |
|   |   | 10 | 11.2 |
|   |   | 20 | 11.2 |

[1] Same as 1 in Table I.
[2] Same as 2 in Table I.
*Not an example of the invention.

What is claimed is:

1. A method for preparing sulfur-curable compositions of essentially saturated olefin polymers, said method comprising the steps of (1) intimately admixing from about 80 to about 99.8 parts by weight of a normally solid, saturated olefin polymer consisting essentially of (a) at least one polymerized monomer selected from the group consisting of alpha-olefin and monovinylidene aromatic compound and (b) up to about 10 weight percent of polymerized ethylenically unsaturated monomer and from about 0.1 to about 10 parts by weight of an unsaturated organic polymer having pendant vinyl groups in its molecular structure and selected from the group consisting of polymers consisting essentially of $\alpha,\omega$-multiolefin and polymers consisting essentially of polymerized unaturated bicyclic compound having the configuration

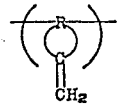

wherein R is a polymerized cyclic hydrocarbon, (2) cracking the polymeric components of the resulting mixture by heating said mixture at temperatures between 200° and 500° C. and shearing said mixture at a shear rate between about 200 and about 100,000 reciprocal seconds and (3) introducing from about 0.1 to about 10 parts by weight of a sulfur curing agent into the cracked mixture.

2. The method according to claim 1 wherein the olefin polymer is polyethylene.

3. The method according to claim 1 wherein the unsaturated organic polymer is 1,2-polybutadiene.

4. The method according to claim 1 wherein the saturated olefin polymer is selected from the group consisting of polyethylene, polypropylene, poly(iso-butene), poly(sec-butene), poly(1-butene), poly(1-hexene), polystyrene, poly(alphamethylstyrene), poly(ar-methylstyrene), poly(ar-ethylstyrene), poly($\alpha$,ar-dimethylstyrene), poly(ar,ar-dimethylstyrene), poly(ar-t-butylstyrene), copolymers of ethylene and 1-butene and copolymers of ethylene and propylene and the unsaturated organic polymer is selected from the group consisting of 1,2-polybutadiene, poly(1,4-pentadiene), poly(1,5-hexadiene), 1,2-polyhexatriene, poly(1,3,6-heptatriene) and polymers of methylene norbornylene.

5. The method according to claim 4 for preparing sulfur-curable compositions of essentially saturated olefin polymers, said method comprising the steps of (1) intimately admixing from about 80 to about 99.8 parts by weight of a normal solid saturated olefin polymer selected from the group consisting of polyethylene, polypropylene, poly(1-butene), copolymers of ethylene and butene-1, and copolymers of ethylene and propylene and from 0.1 to about 10 parts by weight of an unsaturated organic polymer selected from the group consisting of 1,2-polybutadiene, poly(1,4-pentadiene), poly-(1,5-hexadiene), 1,2-polyhexatriene, and poly(1,3, 6-heptatriene), (2) cracking the polymeric components of the resulting mixture by heating the resulting mixture to a temperature between about 200° and about 500° C. and shearing the mixture at a shear rate between about 200 and about 100,000 reciprocal seconds for a period of less than one minute, and (3) introducing from about 0.1 to about 10 parts by weight of a sulfur-curing agent to the cracked mixture.

6. The method according to claim 1 which includes as step (4) curing the resulting composition by heating the same to a temperature from about 170° C. to about 280° C. for a period from about 1 to about 40 minutes.

References Cited

UNITED STATES PATENTS

| 2,832,748 | 4/1958 | Sofford et al. | 260—889 |
| 2,924,559 | 2/1960 | Sofford et al. | 260—889 |
| 3,299,181 | 1/1967 | Coover et al. | 260—889 |
| 3,407,185 | 10/1968 | Natta et al. | 260—878 |
| 3,407,253 | 10/1968 | Yoshemura et al. | 260—889 |

FOREIGN PATENTS

| 685,258 | 4/1964 | Canada | 260—889 |

OTHER REFERENCES

Hofmann: Vulcanization and Vulcanization Agents, pp. 73; 232–239, pub. 1967.

Billmyer: Text Book of Polymers Sciences, pp.535–537, pub. 1964.

MURRAY TILLMAN, Primary Examiner

C. J. SECCURO, Assistant Examiner

U.S. Cl. X.R.

260—23 S, 23 H, 41 R, 79.5 A, 79.5 B, 79.5 P, 874, 888, 892, 897 A